US009734673B2

(12) United States Patent
Priesterjahn et al.

(10) Patent No.: US 9,734,673 B2
(45) Date of Patent: Aug. 15, 2017

(54) AUTOMATED TELLER MACHINE COMPRISING CAMERA TO DETECT MANIPULATION ATTEMPTS

(75) Inventors: Steffen Priesterjahn, Paderborn (DE); Dinh-Khoi Le, Paderborn (DE); Michael Nolte, Brakel (DE); Alexander Drichel, Bielefeld (DE)

(73) Assignee: Wincor Nixdorf International GmbH (DE)

( * ) Notice: Subject to any disclaimer, the term of this patent is extended or adjusted under 35 U.S.C. 154(b) by 903 days.

(21) Appl. No.: 13/264,115

(22) PCT Filed: Apr. 16, 2010

(86) PCT No.: PCT/EP2010/055008
§ 371 (c)(1), (2), (4) Date: Oct. 12, 2011

(87) PCT Pub. No.: WO2010/121951
PCT Pub. Date: Oct. 28, 2010

(65) Prior Publication Data

US 2012/0038772 A1 Feb. 16, 2012

(30) Foreign Application Priority Data

Apr. 22, 2009 (DE) ........................ 10 2009 018 322

(51) Int. Cl.
*H04N 7/18* (2006.01)
*G07F 19/00* (2006.01)

(52) U.S. Cl.
CPC ............ *G07F 19/207* (2013.01); *G07F 19/20* (2013.01)

(58) Field of Classification Search
CPC ............................... G07F 19/02; G07F 19/207
(Continued)

(56) References Cited

U.S. PATENT DOCUMENTS 8,396,766 B1 * 3/2013 Enright et al. .................. 705/35
2004/0164141 A1 * 8/2004 Egami et al. ................. 235/379
(Continued)

FOREIGN PATENT DOCUMENTS

CN 101059891 A 10/2007
CN 101344980 A 1/2009
(Continued)

OTHER PUBLICATIONS

International Preliminary Report on Patentability (Chapter I of the Patent Cooperation Treaty) in German (with English translation) for PCT/EP2010/055008, issued Oct. 25, 2011.
(Continued)

*Primary Examiner* — Nhon Diep
(74) *Attorney, Agent, or Firm* — Harness, Dickey & Pierce, P.L.C.

(57) ABSTRACT

An automated teller machine (ATM) is proposed having a control panel (CP) that has elements (1, 2, 3, 4, 5) arranged therein that are provided for users of the automated teller machine (ATM) and that has a camera (CAM) to detect manipulation attempts on the automated teller machine (ATM). The camera (CAM) is mounted in a housing section of the automated teller machine (ATM) surrounding the control panel (CP) and aligned in such a way that the camera (CAM) captures images of at least two of the elements (1, 2) arranged in the control panel (CP). In particular, the camera (CAM) captures image of the money dispensing compartment (1) and the keypad (2) in order to unequivocally detect any overlays installed there and similar manipulation or skimming attempts.

14 Claims, 3 Drawing Sheets

(58) Field of Classification Search
USPC .......................................................... 348/150
See application file for complete search history.

(56) References Cited

U.S. PATENT DOCUMENTS

| | | | | |
|---|---|---|---|---|
| 2006/0118624 | A1* | 6/2006 | Kelso | G06K 13/07 235/444 |
| 2006/0169764 | A1* | 8/2006 | Ross | G07F 19/20 235/375 |
| 2008/0219508 | A1* | 9/2008 | Ganguli et al. | 382/104 |
| 2009/0201372 | A1* | 8/2009 | O'Doherty et al. | 348/150 |

FOREIGN PATENT DOCUMENTS

| | | | |
|---|---|---|---|
| DE | 20102477 | U1 | 5/2001 |
| DE | 20318489 | U1 | 2/2004 |
| GB | 2351585 | A | 1/2001 |
| WO | WO-2005109315 | A2 | 11/2005 |
| WO | WO-2007093977 | A1 | 8/2007 |

OTHER PUBLICATIONS

International Search Report (in German with English Translation) for PCT/EP2010/055008, mailed Aug. 25, 2010; ISA/EP.
European Examination Report for Application No. EP 10 718 914.4 dated Jun. 24, 2014 (5 pages).
English translation of Chinese Office Action for Application No. 2010-80017768 dated May 26, 2014 (8 pages).

* cited by examiner

AUTOMATED TELLER MACHINE COMPRISING CAMERA TO DETECT MANIPULATION ATTEMPTS

CROSS-REFERENCE TO RELATED APPLICATIONS

This application is a National Stage of International Application No. PCT/EP2010/055008, filed Apr. 16, 2010, and published in German as WO 2010/121951 A1 on Oct. 28, 2010. This application claims the benefit and priority of German application 10 2009 018 322.1, filed Apr. 22, 2009. The entire disclosures of the above applications are incorporated herein by reference.

BACKGROUND

This section provides background information related to the present disclosure which is not necessarily prior art.

Technical Field

The invention relates to an automated teller machine having a camera to detect manipulation. The invention relates in particular to an automated teller machine designed as a cash dispenser.

Discussion

In the area of self-service automats, in particular cash dispensers, criminal actions in the form of manipulation are frequently undertaken with the goal of spying out sensitive data, in particular PINs (personal identity numbers) and/or card numbers of users of the automated teller machine. Manipulation attempts are known specifically in which so-called skimming devices, such as keypad overlays and similar, are installed illegally in the operating area or on the control panel. Such keypad overlays often have their own power supply, as well as a processor, a memory and an operating program so that an unsuspecting user is spied on when entering his PIN or inserting his bank card. The data mined in this way are then sent over a transmitter integrated into the keypad overlay to a remote receiver or stored in a memory in the overlay. Many of the skimming devices encountered today can be distinguished only with great difficulty by the human eye from original controls (keypad, card reader, etc.).

In order to frustrate such manipulation attempts, monitoring systems are often used that have one or more cameras installed close to the site of the automated teller machine to capture images of the entire control panel and often the area occupied by the user as well. One such solution is described in DE 201 02 477 U1. Images of both the control panel and the user area immediately in front of said panel can be captured by means of camera monitoring. One additional sensor is provided in order to distinguish whether a person is in the user area.

SUMMARY OF THE INVENTION

An object of the present invention is to propose a solution for the simplest possible camera monitoring that likewise allows reliable detection of manipulation attempts.

Accordingly, an automated teller machine is proposed in which the camera is mounted inside a housing section surrounding the control panel and is oriented in such a way that the camera captures images of at least two of the elements arranged in the control panel.

As a result, detection of overlays on individual or several elements is improved. The camera can also be used to monitor the function of individual elements and/or their operation by the user in order to detect possible functional or operating errors. For example, the camera captures images of the money-dispensing compartment of the automated teller machine and can reliably detect not only manipulation attempts but also monitor, for example, whether a user has removed all the notes from the compartment when money is issued or whether notes were retracted again by the automated teller machine (the retract scenario). Many additional applications are possible.

Preferably the elements of which images are captured by the camera are elements suitable for manipulation and/or elements located in areas of the control panel suitable for manipulation, such as the money-dispensing compartment, keypad, card slot and/or monitor. The elements are therefore preferably operating elements in the stricter sense, but they can also be other elements, such as an installation panel in the control panel area, or a logo, information sign, lettering or something similar. The camera has an acquisition angle that preferably captures images of several control elements, such as the money-dispensing compartment and the keypad. To this end, the camera preferably has a wide-angle lens with an acquisition angle of at least 130 degrees.

Consequently, it is advantageous if the camera is installed in that housing section of the automated teller machine that (bounds) the control panel at the side or at the top. This can specifically be the surround of the control panel.

Furthermore, the camera can be connected to a data processing unit that processes the data generated by the camera. Provision can be made for the data processing unit to be integrated into the automated teller machine. In this context, provision can also be made for the data processing unit to have a first stage receiving the image data for image processing, specifically for shadow removal, edge detection, vectorizing and/or segmenting. Specifically, the data processing unit can have a second stage downstream from the first stage for feature extraction, wherein blob analysis, edge position and/or color distribution in particular is performed. In addition, a third stage downstream from the second stage can be provided for classification.

The data processing unit can also have interfaces for video monitoring systems or units (CCTV) and/or for security systems.

Preferably, the images of the elements captured by the camera have optically clearly recognizable features, in particular edges demarcated from homogenous surfaces.

Provision can also be made for an additional camera that is oriented to an area in which a user, more specifically his head, is located when using the automated teller machine.

Provision can also be made for the data processing unit, when it detects a manipulation attempt at the captured elements by processing the image data, to trigger an alarm, to disable the automated teller machine and/or to activate the additional camera.

The camera and/or the data processing unit are preferably deactivated during the operation and/or maintenance of the automated teller machine.

BRIEF DESCRIPTION OF THE DRAWINGS

The invention and the advantages resulting therefrom are described hereinafter using embodiments and with reference to the accompanying schematic drawings.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
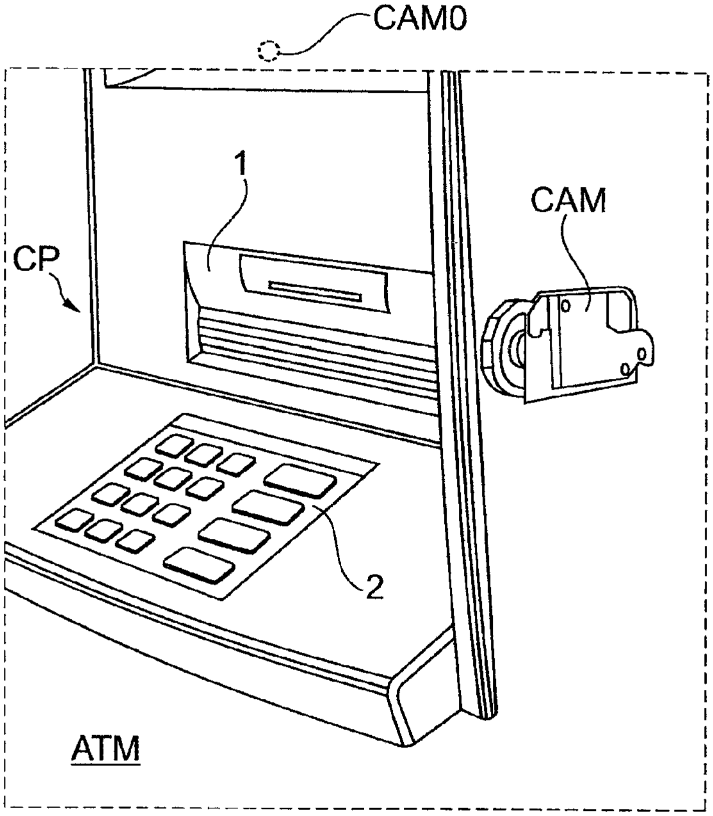
FIG. 1 shows a perspective view of the control panel of an automated teller machine with an integral camera to one side.

FIG. 1 shows in a perspective view the principle structure of a self-service terminal having the form of an automated teller machine ATM with a control panel CP and equipped with a camera CAM in accordance with the invention to detect manipulation attempts. The camera CAM is located in a side part of the housing that surrounds or encloses the control panel of the automated teller machine ATM. The control panel also specifically includes a money-dispensing compartment 1, also called a shutter, and a keypad 2. These are controls against which manipulation attempts may preferably be made, for example in the form of overlays for the purpose of skimming. The area or angle captured by the camera CAM covers at least these two elements 1 and 2 and allows reliable detection of such manipulation attempts.

Figure 2:
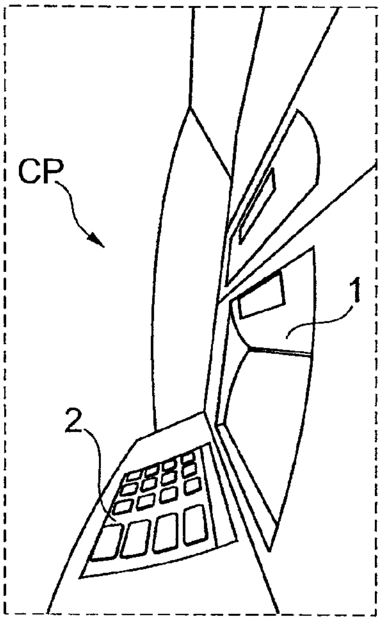
FIG. 2 reproduces the area covered by the camera from FIG. 1.

FIG. 2 shows the area covered by the camera CAM from the viewpoint of the camera. The money-dispensing compartment 1 and the keypad 2 in particular are located in said area. The camera is equipped with a wide-angle lens in order to capture images of at least these two elements or partial areas of the control panel. The automated teller machine ATM is configured in such a way that the aforesaid elements 1 and 2 preferably have surfaces that are as homogenous as possible with demarcating edges. This simplifies object recognition. By mounting the camera CAM in this particularly suitable position, the aforementioned partial areas or elements 1 and 2 can be measured optically with great realiability. Provision can be made for the camera to be sharply focused in particular on specific areas. An alternative position for the camera is shown from FIG. 3.

Figure 3:
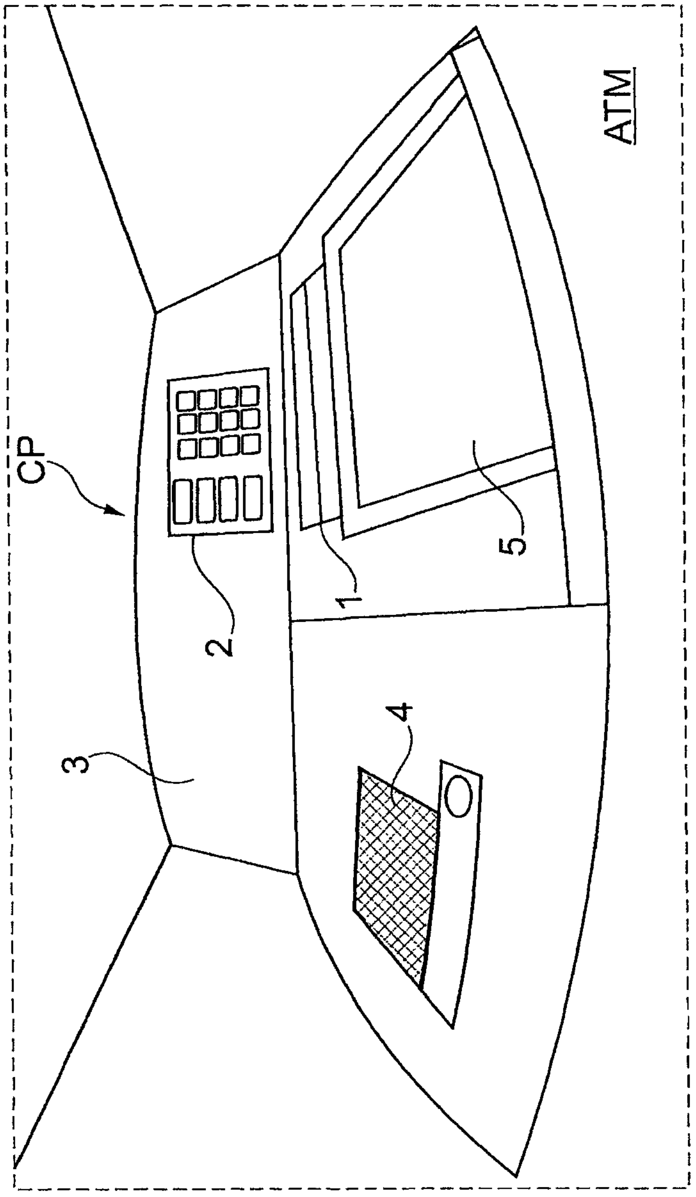
FIG. 3 reproduces the area covered by a camera that captures images of the control panel from above.

FIG. 3 illustrates the field covered by a camera that resembles the camera CAM but is now installed in the upper area of the automated teller machine ATM, and capturing images of the control panel CP from above. Still other elements can be provided in the field of capture of the camera in addition to the money-dispensing compartment 1 and the keypad 2, for example, an installation panel in the vicinity of the keypad, a card slot 4, i.e. a guide for the card reader, and a monitor 5, or display. These additional elements mentioned 3, 4 and 5 represent potential targets for manipulation attempts.

The camera has a lens optimized for this application and, as an example, a resolution of 2 megapixels and greater. The camera is connected to a special data processing unit 10 (refer to FIG. 4). This data processing unit, to be described later, makes it possible to optimally analyze the image data generated by the camera in order to detect a manipulation attempt, such as an overlay on the keypad 2, immediately and with great certainty and to trigger alarms and deactivation as needed. The following are some of the manipulations that can be reliably detected by means of the data processing unit:

- Installation of a keypad overlay
- Installation of a complete overlay at the lower installation panel
- Installation of an overlay on the money-dispensing compartment (shutter) and/or installing objects to record security information, specifically PINs, such as mini-cameras, camera cell phones and similar spy cameras.

In order to detect the presence of overlays, an optical measurement of the captured elements, such as the keypad, is performed inside the data processing unit 10 with the aid of the camera CAM, in order to detect discrepancies clearly in the event of manipulation. Tests on the part of the applicant have shown that reference discrepancies in the millimeter range can be detected clearly. The requisite image data processing is performed principally in the data processing unit described hereinafter.

Figure 4:
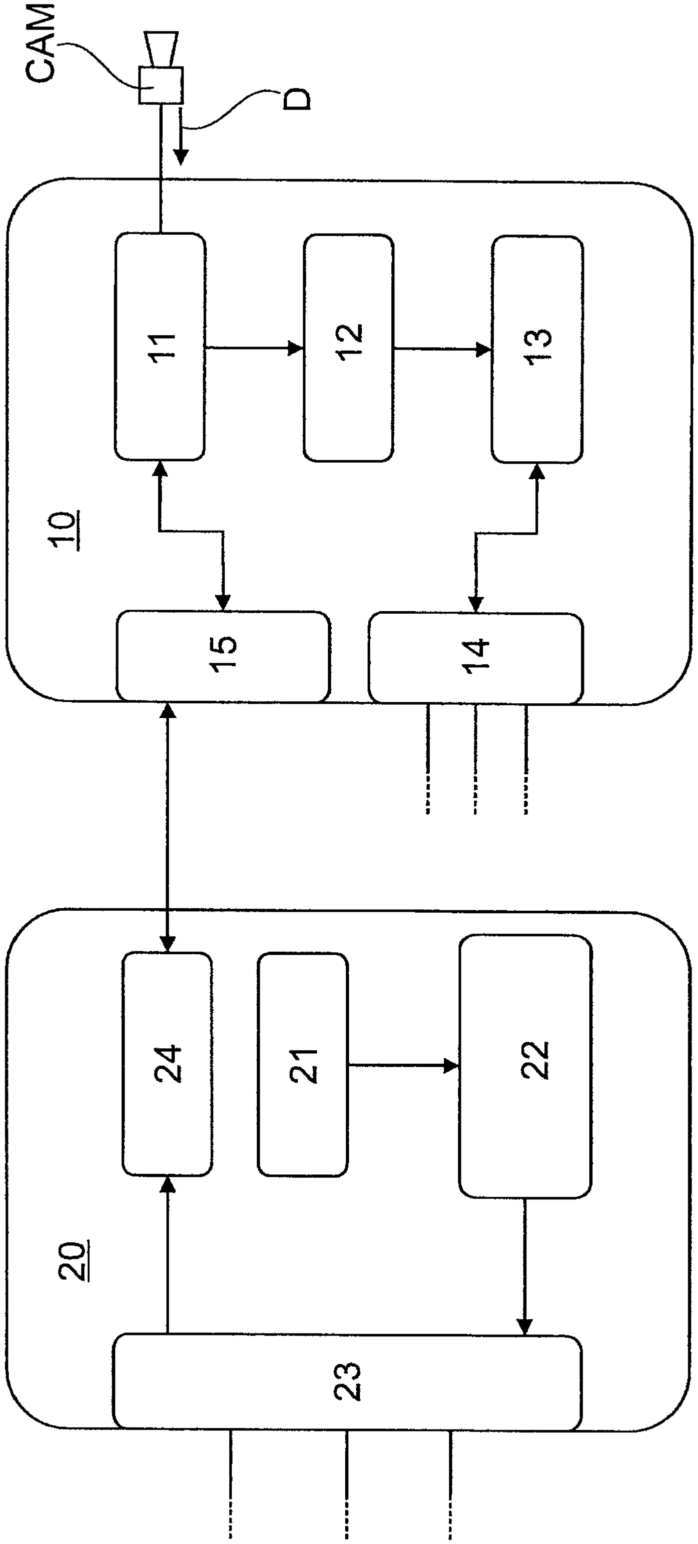
FIG. 4 shows a block diagram for a data processing unit connected to the camera and a video monitoring unit connected to said processing unit.

FIG. 4 shows the block diagram for a data processing unit 10 in accordance with the invention to which the camera CAM is connected, as well as a video monitoring unit, or CCVT unit 20, that is connected to the data processing unit 10. The data processing unit 10 has specifically the following stages or modules:

A first stage 11 for image processing, a second stage 12 for feature extraction, and a third stage 13 for classifying the processed data. Stage 13 is, in turn, connected to an interface 14 over which the various alarm or monitoring devices can be activated or controlled. These devices, known henceforth as AISS, include image falsification or manipulation detection (IFD). The first stage 11 that serves for image processing is in turn connected to a second interface 15 over which a link is established to the CCTV unit 20. Remote monitoring or remote diagnosis, for example, can be performed with the help of this CCTV unit.

The data processing unit 10 is primarily responsible for processing the image data D generated by the camera CAM. The image data D arrive initially at the first stage 11 that performs a pre-processing of the incoming image data, when steps such as shadow removal, edge detection, vectorizing and/or segmenting in particular are carried out. The downstream second stage 12 is used for feature extraction, which can be carried out, for example, by means of blob analysis, edge positioning and/or color distribution. Blob analysis, for example, is used to detect cohesive areas in an image and to perform measurements on the blobs. A blob (binary large object) is an area of adjacent pixels having the same logical status. All pixels in an image that form part of a blob are in the foreground. All remaining pixels are in the background. In a binary image, pixels in the background have values that correspond to zero, while each pixel not equal to zero is part of a binary object.

Then, in stage 13, a classification is made which determines on the basis of the extracted features whether a hostile manipulation at the self-service terminal, or automated teller machine ATM, has been carried out or not.

The data processing unit 10 can, for example, be implemented by means of a personal computer that is linked to the automated teller machine ATM or is integrated into said ATM. Besides the camera CAM described that captures images of the areas of the control panel CP already mentioned, an additional camera CAMO can be installed on the automated teller machine ATM (refer to FIG. 1) that is directed at the user or customer and specifically identifies his face. This additional camera CAMO, also described as a portrait camera, can be triggered to take a portrait of the person standing at the ATM when a manipulation attack is identified. As soon as a skimming attack is detected, the system just described can perform the following actions:

Store a photograph of the attacker, when both the CAM camera and the supplementary portrait camera can be activated, Alarm the active ATM applications and/or central management server and/or a person, for example, by e-mail, Introduce counter-measures that include disabling or shutting down the ATM, Transmit data, specifically images, of the manipulation detected, for example over the Internet or a central office.

The operator of the automated teller machine can configure the scope and the type of measures, or countermeasures, taken using the system described here.

Instead of an individual camera (refer to CAM in FIG. 1) installed directly at the control panel, several cameras can also be provided, wherein a first camera captures images of the control panel from the outside, a second camera captures images, for example, of the card slot from the inside. In addition, a third camera that corresponds to the aforementioned portrait camera (refer to CAMO in FIG. 1) can be provided. The camera CAM at the control panel and the camera in the card slot (not shown here) are used for the actual detection of manipulation. The portrait camera CAMO is used here for purposes of documenting a manipulation attempt.

All the cameras preferably have a resolution of at least 2 megapixels. The lenses used have an acquisition angle of about 140 degrees and greater. In addition, the exposure time of the cameras used can be freely adjusted over a broad range from 0.25 msec, for example, up to 8000 msec (8 secs.). In this way, it is possible to adjust to the widest possible range of lighting conditions. Tests by the applicant have shown that a camera resolution of about 10 pixels per degree can be obtained. Referred to a distance of one meter, it is possible to achieve an accuracy of 1.5 mm per pixel. This means, in turn, that a manipulation can be detected reliably using a reference deviation of 2 to 3 mm. The closer the camera lens is to the imaged element or observed object, the more precise the measurement. As a result, precision of less than 1 mm can be achieved closer up.

Depending on where the automated teller machine will be used, for example outside or inside, as well as on the existing light conditions, it may be of advantage to install the camera CAM in the lateral part of the housing of the automated teller machine ATM or in the upper part of the housing. Various possibilities for monitoring exist depending on the camera position. When monitoring the different elements, or partial areas, the following possibilities emerge:

Capturing images of the money dispensing compartment (shutter) 1 permits checking for manipulation in the form of cash trappers, i.e. special overlays. Capturing images of the keypad area makes it possible to determine manipulation attempts using overlays or changes to security lighting. Capturing images of the installation panel makes it possible in particular to detect complete overlays. Capturing images of the card slot 4, particularly using an integral camera, makes it possible to detect manipulations in this area.

It has been shown that discrepancies of 2 mm can be clearly detected in particular at the keypad and the card slot. Discrepancies at the rear outer edge of the installation panel can be detected starting at 4 mm. Discrepancies at the lower edge of the shutter can be detected starting at 8 mm.

The data processing unit 10 (refer to FIG. 4) performs a comparison of the recorded image data D specifically with reference data to detect manipulations. An image of the outer area in particular can be inspected for its homogeneity and compared with the image of the outer area of the control panel camera. In addition, the surroundings can be examined for a reflection of the lighting for the card slot 4. The connection of the system to the Internet over the interface 23 makes it possible to activate the camera, or the various cameras, by remote access. The image data thus acquired can also be transmitted to a video server over the Internet connection. The particular camera acts almost as a virtual IP camera. The CCTV unit 20 described above serves in particular as one such possibility for video monitoring; interface 15 is designed for the CCTV unit for such monitoring for the following functions:

Retrieving an image, adjusting the image rate, the color model, image resolution, triggering an event in the CCTV service when preparing a new image and/or possibly a visual enhancement of detected manipulations on a prepared image.

The system is designed such that in normal operation (e.g. withdrawing money, account status inquiry, etc.) no false alarms are created by hands or objects in the image. For this reason, manipulation detection is deactivated in the period of normal use of an ATM. Also, time periods of cleaning or other brief uses (filing bank statements, interaction before and after the start of a transaction) should not be used as examples of manipulation detection. Essentially, only fixed and immobile manipulation attempts are preferably analyzed and detected. The system is designed such that monitoring operates even under a great variety of light conditions (day, night, rain, cloud, etc.). Similarly, briefly changing light conditions, such as light reflections, passing shadows and the like are compensated for or ignored in the image processing in order to prevent a false alarm. In addition, events of a technical nature, such as a lighting failure and the like, can be taken into consideration. These and other special cases are detected for classification and solved in particular by the third stage.

The method carried out by the system described for detecting manipulation exhibits in particular the following stages (refer to FIG. 4):

In a first step, an image is initially recorded (stage 11), wherein the camera parameters are adjusted to generate suitable images. In so doing, a series of images or corresponding image data D is recorded that serves as the basis, or reference, for pre-processing.

Then image data D are pre-processed (stage 11), wherein these data are processed such that they are suitable for further processing. For example, several images are combined into a target image and optimized using image enhancement algorithms. The following steps in particular are performed:

Shadow removal, deletion of moving objects, elimination of noise and/or combination of differently exposed photographs.

Some of the adjustments to the cameras are for different exposure times, to eliminate reflections and to assemble well lighted areas. The images are preferably assembled over a predetermined period in order to obtain the best possible images for manipulation detection. Feature extraction is performed in a third step (stage 12) in which image analysis methods are applied to the pre-processed images or image data in order to inspect said images or image data for specific features, such as edge positions or color distributions. A number or a value is assigned to each feature that indicated how well the corresponding feature was found in the scanned image. The values are collected in what is known as a features vector.

In a further step, a classification is carried out (Stage 13), i.e. the feature vector is passed on to a classification sequence to reach the decision whether manipulation exists or not. The types of classifiers are used that are able to indicate a confidence, i.e. a probability or certainty, with which the decision holds true. The classification mechanisms may include, for example:

Learning classifier systems, Bayes classifiers, support vector machines (SVM) or decision trees (CART or C 4.5).

The system described here is preferably modular in construction, in order to make different configurations possible. The actual image processing and the CCTV connection are implemented in different modules (refer to FIG. 4).

The system presented here is also suitable for documenting the manipulations detected, or archiving said manipulations digitally. In the event of a detected manipulation, the images recorded, along with corresponding meta-information, such as time stamp, type of manipulation, etc., are saved on a hard disc in the system or on a connected PC. Messages can also be forwarded to a platform for the purposes of reporting, such as error reports, status reports (deactivation, change of mode), statistics, suspected manipulation and/or alarm reports. In the event of an alarm, a suitable message containing the specific alarm level can be transmitted to the administration interface or interface. The following possibilities can additionally be implemented at said interface:

Uploading camera data, such as the number of cameras, construction status, serial number, etc., master camera data, or adjustment of camera parameters and/or registration for alarms (notifications).

The invention presented here is specifically suitable for reliably detecting hostile manipulations at an automated teller machine, such as a cash dispenser. To this end, the control panel is continuously and automatically monitored by at least one camera. Using image data processing, the elements captured by the camera are measured optically to identify deviations from reference data. It has already been shown that discrepancies in the range of mere millimeters can be identified reliably. A combination of edge detection and segmenting is preferably used for detecting foreign objects so that contours of objects left behind can be clearly detected and identified. In the event of attempted manipulation, countermeasures or actions can be initiated.

The present invention was described using the example of a cash dispenser, but is not restricted thereto and can be applied to any type of self-service terminal.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. An automated teller machine having a control panel which has elements located therein that are provided for users of the automated teller machine and that has a camera to detect manipulation attempts at the automated teller machine, comprising wherein the camera is mounted in a housing section of the automated teller machine surrounding the control panel and is aligned such that one camera captures images of at least a money dispensing compartment and a keypad provided in the control panel;

wherein the camera is installed in that section of the housing of the automated teller machine that bounds the control panel to the side or to the top;

wherein the camera is connected to an image data processing unit that processes image data generated by the camera; and wherein the camera and/or the image data processing unit is deactivated during normal authorized operation of withdrawing money from the automated teller machine so that no false alarms are created by hands or objects in the image.

2. The automated teller machine according to claim 1, wherein at least the elements captured by the camera represent elements suitable for manipulation and/or represent elements located in areas of the control panel suitable for manipulation.

3. The automated teller machine according to claim 1, wherein the elements captured by the camera are controls that further include an installation panel work surface, a card slot or a monitor.

4. The automated teller machine according to claim 1, wherein the camera has a wide-angle lens with an acquisition angle of at least 130 degrees and/or a resolution of at least 2 megapixels.

5. The automated teller machine according to claim 1, wherein the data processing unit is integrated into the automated teller machine.

6. The automated teller machine according to claim 1, wherein the image data processing unit has a first stage receiving the image data for processing, in particular for shadow removal, edge detection, vectorizing and/or segmenting.

7. The automated teller machine according to claim 6, wherein the image data processing unit has a second stage downstream from the first stage for feature extraction, specifically by means of blob analysis, edge position and/or color distribution.

8. The automated teller machine according to claim 7, wherein the image data processing unit has a third stage downstream from the second stage for classification.

9. The automated teller machine according to claim 1, wherein the image data processing unit has interfaces for video monitoring systems and/or security systems.

10. The automated teller machine according to claim 1, wherein at least the elements captured by the camera have optically recognizable features, in particular have edges demarcated from homogenous surfaces.

11. The automated teller machine according to claim 1, wherein the image data processing unit, when it detects a manipulation attempt at the elements captured by processing the image data, triggers an alarm, disables the automated teller machine and/or triggers the additional camera.

12. The automated teller machine according to claim 1, wherein the camera and/or the image data processing unit monitors dispensing money at the money dispensing compartment.

13. An automated teller machine for detecting overlays on elements on a control panel, comprising:

the control panel having a money dispensing compartment and a keypad spaced from the money dispensing compartment, images of the money dispensing department and the keypad in a non-manipulated condition free from overlays serving as reference data;

a housing surrounding the control panel;

a camera on the housing that simultaneously captures images of both the money dispensing compartment and the keypad;

an image data processing unit that processes image data generated by the camera, the image data processing unit comparing the images of the money dispensing compartment and the keypad from the camera with the reference data to detect the presence of overlays if there are optical deviations therebetween; and wherein the camera and/or the image data processing unit is deactivated during normal authorized operation of withdrawing money from the automated teller machine so that no false alarms are created by hands or objects in the image.

14. An automated teller machine having a control panel which has elements located therein that are provided for users of the automated teller machine and that has a camera to detect manipulation attempts at the automated teller machine, comprising wherein the camera is mounted in a housing section of the automated teller machine surrounding the control panel and is aligned such that one camera captures images of at least a money dispensing compartment and a keypad provided in the control panel;

wherein the camera is installed in that section of the housing of the automated teller machine that bounds the control panel to the side or to the top;

wherein the camera is connected to an image data processing unit that processes image data generated by the camera;

wherein the camera and/or the image data processing unit is deactivated during normal authorized operation of withdrawing money from the automated teller machine so that no false alarms are created by hands or objects in the image; and wherein an additional camera is provided at the automated teller machine for an area in which a user's head is located while using the automated teller machine.

* * * * *